April 27, 1965  G. J. PREISZ  3,180,951
LINEAR ACCELERATION SWITCH
Filed Sept. 17, 1962  2 Sheets-Sheet 1
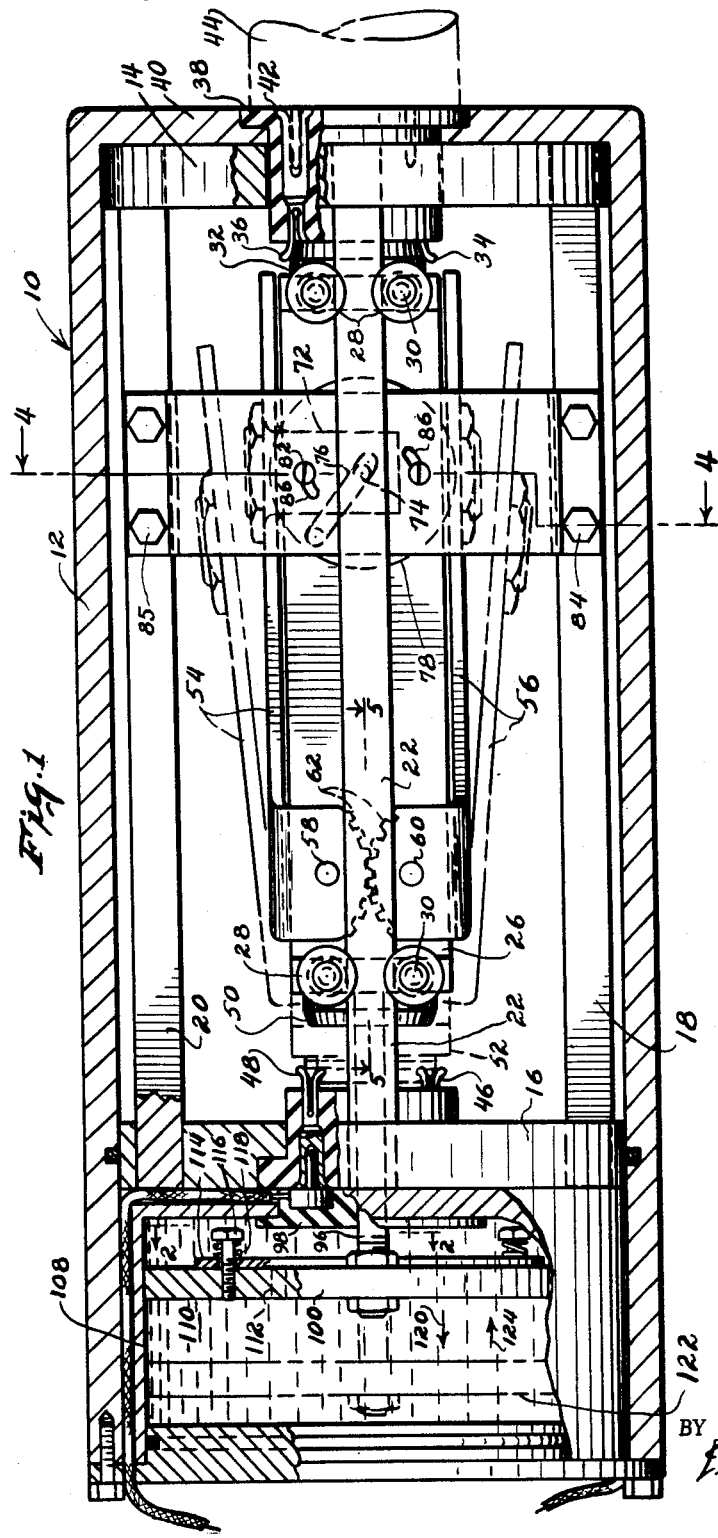
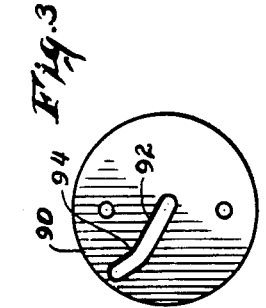
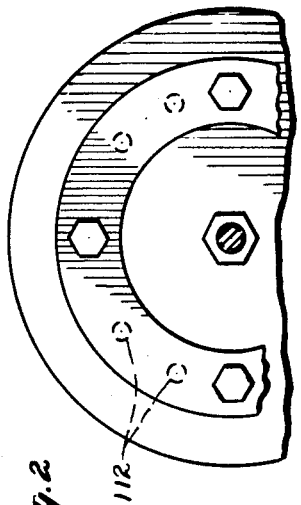
INVENTOR.
GEORGE J. PREISZ
BY
ATTORNEYS

INVENTOR.
GEORGE J. PREISZ

United States Patent Office 3,180,951
Patented Apr. 27, 1965

3,180,951
LINEAR ACCELERATION SWITCH
George J. Preisz, Bethpage, N.Y., assignor to
Cleudeuin Preisz, Bethpage, N.Y.
Filed Sept. 17, 1962, Ser. No. 224,096
6 Claims. (Cl. 200—61.45)

This invention relates to electric switches and, more particularly, relates to inertia actuated switches which will close an electric circuit when subject to acceleration forces of preselected amplitude and duration along a central axis of the switch.

Acceleration switches, that is, switches which will close an electric circuit after the application of an acceleration force along the sensitive axis thereof, are known to the art. In general, such switches employ an inertial mass operating against a spring restraining force or a clockwork restraining force. Such switches are difficult to preset and in operation will measure the applied acceleration only over the preset interval. Further, such switches cannot be so adjusted so as to be responsive to complex acceleration functions, that is, acceleration forces which vary in amplitude with time.

It is, therefore, a primary object of this invention to provide an acceleration switch responsive to acceleration forces along a single axis which can be easily adjusted to make the switch responsive to a predetermined acceleration time integral.

It is a further object of this invention to provide an acceleration switch responsive to acceleration forces having predetermined amplitude-time functions in which the function is operator selectable.

In accordance with these objects, there is provided in a preferred embodiment of the present invention an acceleration switch comprising a casing within which is contained axially extending guide rods spaced apart in parallel relationship. A gimbal is slidably mounted on the rods by means of roller bearings. Since the gimbal is movable only along the axis of the rods, the switch is responsive to acceleration forces applied parallel thereto and is not responsive to transverse or radially applied acceleration forces.

Hingedly coupled to and carried by the gimbal are a first and second mass arm, which arms are rotatably coupled together for conjoint rotation of each arm about its respective pivot point. At the end of the first and second arm, respectively, a magnetic mass and a magnet are mounted, the distance between said mass and magnet being adjustable to adjust the attractive force holding the ends of the arms together.

A cam follower, which may preferably be a pin, is carried at the end of one arm. The pin protrudes outwardly from the arm and engages a track in a rotatably mounted cam.

Upon the application of an acceleration force, therefore, the gimbal and the mass arms are accelerated along the guide rods. With linear movement of the arm, the pin moves within the cam track and the track will deflect the end of the mass arm, causing the arms to rotate about their respective pivots. For such rotation, the deflection force must overcome the magnetic attraction between the magnet and mass at the ends of the arms. Thus, by selection of the magnetic attractive force by selection of the separation distance, and by selection of the inclination of the cam track to be followed by the pin, the acceleration switch can be made responsive to a variety of acceleration conditions and forces.

The cam track may, if desired, be a straight track, the angular orientation of which with respect to the direction of movement of the gimbal is adjusted by the user to select the acceleration amplitude to which the switch will be responsive. Alternatively, it may be a complex curve thereby to make the switch responsive to a function of applied acceleration.

At the end of gimbal travel, the gimbal will operate switch contacts to provide an electrical indication. Also, switch closures may be made at intermediate positions.

Having briefly described the present invention, it will be described in greater detail in the accompanying portions of the specification, which may best be understood by reference to the accompanying drawings, of which:

FIG. 1 is a section view of an acceleration switch constructed in accordance with the present invention;

FIG. 2 is a section view taken along lines 2—2 of FIG. 1;

FIG. 3 is a plan view of a cam which may be used in the switch of FIG. 1;

Figure 4:
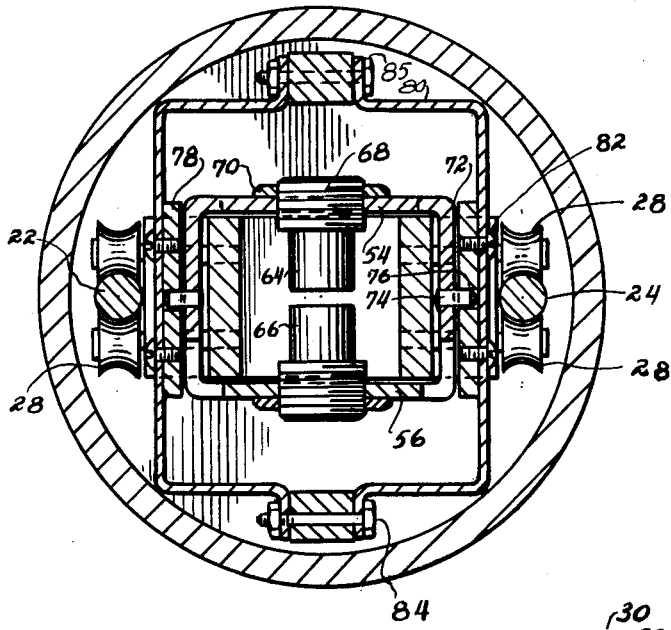
FIG. 4 is a section view taken along lines 4—4 of FIG. 1.
Figure 5:
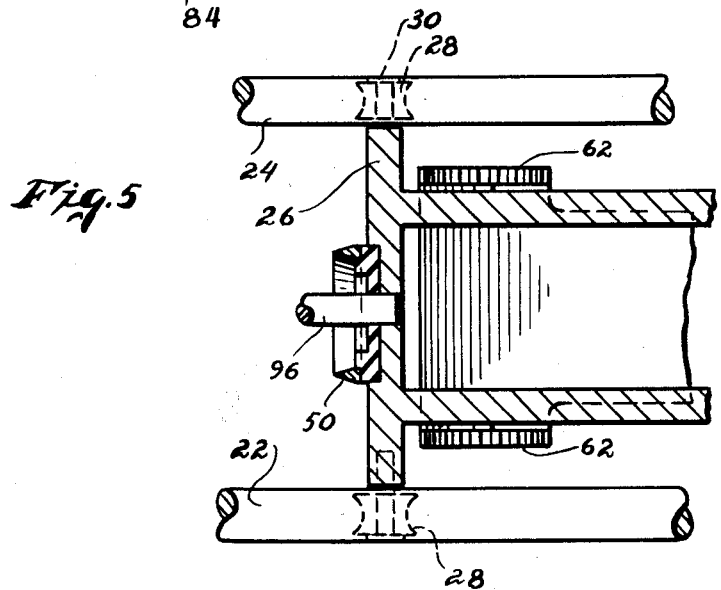
FIG. 5 is a section view taken along lines 5—5 of FIG. 1.

In the figures, there is shown an acceleration switch 10 housed within a casing 12. The casing is provided with end walls 14 and 16 coupled by beams 18, 20 and rails 22, 24 to provide a rigid, unitary structure. Slidably mounted on the rails is a gimbal 26 which is mounted on the rails by rollers 28 rotatably mounted on shafts 30. Thus, the gimbal is slidably mounted and can move from one end of the acceleration switch to the other.

Initially, the gimbal is positioned as shown in FIG. 1 and an angular ring contact 32 affixed to one end thereof serves to bridge and electrically connect the spring clip contacts 34 and 36 at one end thereof. The spring contacts are mounted in an insulator plug 38 extending through the end wall 40 of the case and the wall 14 of the switch. Contact 42 may be provided so that an electrical plug 44 may be utilized to couple operating circuitry to the switch contacts.

Similarly, at the other end of the switch, there are provided contacts 46 and 48 which are closed by ring contact 50 when the gimbal moves to the position shown in dotted outline 52.

In order to controllably restrain the rate of movement of the gimbal under acceleration loading, there are provided acceleration mass arms 54 and 56. Each arm is similar in construction and is pivotably mounted on the gimbal by pin 58 and 60, respectively. The end of the arm is provided with gear teeth 62 which are engaged to ensure conjoint rotation of each arm about its respective mounting pin. The arms are initially held together as a result of the magnetic attraction between a magnet 64 and a soft iron mass 66, respectively mounted in arms 54 and 56. Both the magnet and the mass are carried in caps 68 which threadably engage the mass arms to enable adjustment of the relative distance between the magnet and the mass. The couplings 68 may be locked in any desired position by a lock nut 70.

Thus, the amount of force required to separate the ends of the pivoted arms is adjustable by the user simply by rotating either the mass or the magnet or both to adjust the relative separation therebetween.

The arm 54 is provided with a downwardly extending tab 72 on each side thereof, each of which carries a pin 74 extending outwardly from the surface thereof. The pin engages a cam surface 76 milled in a cam disk 78. The cam disk 78 is rotatably mounted on a bracket 80 by screws 82. The bracket 80 is secured to the beams 18 and 20 by screws 84 and 85, respectively. Slots 86 are provided so that the cam may be rotated and affixed in the desired orientation by the user.

Operation of the inertial switch is as follows:

Under applied acceleration, the inertial mass assembly, comprising the gimbal and the pivoted arms, will tend to move toward the end wall 16 of the switch since the pin coacts with the cam track 76, before actual movement of the gimbal can take place, it is necessary to separate the arms so that the pin 74 may follow the cam track 76. For this separation, it is necessary to overcome the breakaway force established by the magnet 64 and the attractive mass 66. Thus, it is entirely feasible to adjust both the required breakaway force related to acceleration amplitude and the pitch of the cam track which is related to both acceleration amplitude and to the time of application thereof. After application of the requisite acceleration force, the gimbal will reach the position 52 shown to close the switch defined by contacts 46 and 48.

In many applications, it is desirable that the switch respond only after application of an initial small acceleration force and then a larger acceleration force, in which case the cam 3 shown in FIG. 3 may advantageously be used. The cam 90 is provided with a cam surface 92 having a change of slope at the point 94.

Similarly, the cam may be cut along a mathematical curve dependent on the desired acceleration forces to be measured.

In order to damp movement of the gimbal mass, there is provided a shaft 96 which extends through the insulator block 98 in the wall 16 and is attached to a piston assembly 100 in the cylinder 108. The cylinder 108 is filled with fluid 110. Thus, the piston and cylinder acts as a dashpot.

It is often desirable that there be no dampening of the movement under applied acceleration forces and high damping of motion in the opposite direction.

For this purpose, it is often advantageous to provide the pistons with a plurality of apertures 112 pierced therethrough, which apertures are covered by an annular disk 114 secured to the surface by means of a bolt 116 and springs 118. In this manner, upon movement of the piston in the direction shown by arrow 120, the angular disk 114 will move away from the face of the piston uncovering the apertures 112 and allowing fluid to freely flow therethrough. However, when piston reaches the end position as shown by the dotted outline 122, the plate 114 will close on the piston and provide a very high damping resistance to movement of the piston defined in the direction of arrow 124. In this manner, the switch once closed will be substantially immune to opening by vibration applied thereto. The switch may, of course, be reset in those applications where resetting is desirable merely by applying a resetting force for sufficiently long time so as to move the inertial mass back in position by opening the casing and artificially deflecting the disk 114 on the piston.

This invention may be variously modified and embodied within the scope of the subjoined claims.

What is claimed is:

1. An acceleration switch comprising: a support, parallel rails extending axially of said support, at least one contact carried by said support, a gimbal slidably mounted on said rails, at least one contact carried by said gimbal for cooperation with said contact carried by said support, inertial arms pivotably mounted on said gimbal, said inertial arms being coupled together for conjoint rotation of said arms about the respective pivots, magnetic means for holding the ends of said arms together under a magnetic attractive force, the end of one of said arms being provided with at least one tab having an outwardly extending pin rigid therewith, a cam having a track therein mounted in said support in operative relation with said arms, said cam track coacting with said pin so as to regulate the amount of rotation of said arm about said pivot with movement of said gimbal along said track.

2. An acceleration switch in accordance with claim 1 which includes a ring contact on each end of said gimbal, said ring contacts coacting with spring contacts carried by said support at each end of gimbal travel, so as to indicate the end positions of said gimbal.

3. An acceleration switch in accordance with claim 1 in which said magnetic means comprises a magnet mounted in one arm and an attractive mass mounted in the other arm, and which includes means for adjusting the relative separation between said magnet and said attractive mass.

4. The combination in accordance with claim 1 in which said cam is rotatably mounted thereby to adjust the angular orientation of said cam track with respect to axial movement of said gimbal.

5. An acceleration switch in accordance with claim 1 which includes a dashpot coupled to said gimbal.

6. The combination in accordance with claim 5 in which said dashpot comprises a piston, having a plurality of apertures therethrough, and a spring loaded plate urged into engagement with said apertures thereby to provide a restraining force which varies in amplitude with direction of movement of said piston.

References Cited by the Examiner

UNITED STATES PATENTS 2,426,034  8/47  Leonard _____ 200—61.45
2,949,783  8/60  Butler _____ 200—61.45

BERNARD A. GILHEANY, *Primary Examiner.*

ROBERT K. SCHAEFER, *Examiner.*